Aug. 5, 1969 R. E. SPIES 3,459,884
SIGNAL SEPARATING CIRCUIT UTILIZING ALTERNATELY BALANCED AND UNBALANCED BRIDGE CIRCUIT
Filed May 19, 1966 2 Sheets-Sheet 1

Inventor
ROLF E. SPIES
BY
Mueller, Aichele & Rauner
ATTYS.

Inventor
ROLF E. SPIES
BY
Mueller, Aichele & Rauner
ATTYS.

United States Patent Office 3,459,884
Patented Aug. 5, 1969

3,459,884

SIGNAL SEPARATING CIRCUIT UTILIZING ALTERNATELY BALANCED AND UNBALANCED BRIDGE CIRCUIT

Rolf E. Spies, Lyons, Ill., assignor to Motorola, Inc., Franklin Park, Ill., a corporation of Illinois Filed May 19, 1966, Ser. No. 551,383
Int. Cl. H04n 5/38, 5/44
U.S. Cl. 178—5.4 16 Claims

ABSTRACT OF THE DISCLOSURE

In a circuit for time separating color control signals from a composite television signal for a color television receiver, a bridge circuit having first and second diagonals and four branches is provided with one of the branches comprising a diode which is driven between conductive and non-conductive states by gating signals applied thereto. As long as the diode is non-conductive, the bridge is balanced so that no signal appears across the output diagonal. When the diode is rendered conductive by a gating signal, however, the bridge is unbalanced and the composite color television signal appearing at the bridge input is coupled to the output diagonal of the bridge.

The composite color television signal includes luminance components, chroma components and a color synchronizing componet. The chroma componets contain color difference signals which are demodulated by synchronous demodulation. In order to make the synchronous demodulation possible, the color synchronizing burst has to be extracted from the composite video signal.

A know type of burst separator used in a color television receiver utilizes a transistor and the chroma signal is coupled directly to the base which is normally operating in cutoff. Coincidental with burst time a horizontal gating pulse of suitable duration is applied to the base or emitter of the transistor keying the transistor on and resulting in an amplified burst signal which is utlized for phase and frequency control of the reference carrier oscillator. Since the chroma components are applied continuously to the transistor, it must be well neutralized to prevent any feed-through of chroma components due to the base-collector capacity which could disturb the color synchronization. Since in most sets the burst amplitude is high enough to synchronize a locked oscillator directly, a passive burst gate which needs no neutralization has considerable advantage.

Accordingly, it is an object of this invention to provide a simple and inexpensive burst separator which needs no neutralization of active elements as above described.

A feature of the invention is the provision of a bridge circuit with a diode, or other potential responsive impedance device, arranged in one branch so that the bridge is balanced with the device non-conductive to prevent translation of a signal. When the device is gated on, the balance is disturbed and the separated color control signal will appear at the output of the bridge circuit.

Present day color television receivers generally reestablish the DC component of the chroma modulation components (representing color difference signals) by means of DC clamping circuits during retrace time. It is for this reason that the burst signals accompanying the synchronizing pulses then have to be gated out of the signal so that any amplitude variation of these burst signals does not affect the clamped level of the chroma component and cause a background color shift in the picture. Such a system requires further gating circuitry for this removal of the burst signal from the color difference signal channels.

Another object of this invention is to provide a separating circuit which responds to one single gating pulse to develop burst and chroma components as two independent and mutually exclusive output signals.

A further object is to provide a bias circuit for the chroma components branch of the separating circuit which can cut off or interrupt this branch when no color television signal is received to provide what is commonly called a color killer.

Still another object is to provide a control network for a burst and chroma component separator to vary the amplitude of the chroma components thereby affording automatic chroma control.

Another feature of this invention is the provision of two bridge circuits having a branch in common so one bridge can be unbalanced to provide burst signals and the other can be unbalanced to provide chroma signals.

A further feature is the provision of a control voltage killer circuit to override the gating of the bridges and prevent an output when no color control signal is applied to the common branches.

Still another feature of the invention is the provision of a control circuit at the output for the chroma components of one bridge which is responsive to an automatic color control voltage for controlling the amount of unbalance of that bridge circuit depending on the amplitude of the chroma signal.

A specific form of the invention utilized for a color television receiver includes a synchronizing and deflection section and a color signal amplifier. In order to separate the burst signals from the color signals a bridge circuit is gated with the horizontal blanking pulse of the synchronizing and deflection section. The bridge circuit comprises a transformer coupled to the color signal amplifier and responsive to the color signal. The secondary winding has a grounded center tap so that both parts of the winding provide two adjacent branches of the bridge. The remaining branches of the bridge circuit comprise a first capacitor and a diode connected in series across the secondary winding. When the diode is nonconducting the capacitance of the layer junction is of a value such that the bridge is kept in balance. The junction of the first capacitor and the diode is connected through two resistors in series to ground and also to a reference oscillator. The polarity of the diode is such that blanking pulses applied from the synchronizing and deflection section to the junction of the two resistors render the diode conductive. Thus, the bridge is unbalanced and the burst portion of the color signal appears at the junction of the first capacitor and the diode to provide an output for synchronizing the reference oscillator.

In order to separate the chroma subcarrier modulation components and a burst signal representing the chroma subcarrier, the separation circuit comprises a first and second bridge circuit having two branches in common. The common branches comprise a center tapped secondary winding of a transformer, the primary winding of which is coupled to video signal supply means for supplying the color control signal. The separated branches of the first bridge comprise a first capacitor and a first diode device series connected across the secondary winding. The second bridge comprises a second diode device and a second capacitor also connected across this winding. The junction of the first capacitor and the first resistor is connected through a first resistor to ground potential and provides an output for the chroma components which are applied to a color amplifier. The junction of the second diode device and second capacitor is connected through a second resistor to the ground potential and provides an output for the burst signal. The center tap of the secondary winding is coupled to the synchronizing and deflection means and further to a direct current (DC) bias source. The DC bias source supplies a bias potential through the secondary winding to the first diode device for rendering the same conductive, and to the second diode device for rendering the same non-conductive which unbalances the first bridge circuit and balances the second bridge circuit so that the chroma components are available across the first resistor whereas no signal is available across the second resistor. During the retrace time of the control signal a gating pulse is applied from the synchronizing and deflection means through the secondary winding to the first and second diode devices. This gating pulse renders the first diode device non-conductive and the second diode device conductive which balances the first bridge circuit and unbalances the second bridge circuit so that the burst signal is available across the second resistor whereas no signal is available across the first resistor.

In order to use the two bridge separation circuit as a color killer circuit when no color control signal is supplied to the primary winding, a switch device is connected to the junction of the first diode device and the first capacitor. This device is gated on by a color killer voltage which reverse biases the first diode device so that the chroma branch of the bridge is balanced and no noise can reach the chroma processing circuitry.

The two bridge separation circuit can also be used for an automatic chroma control. In this case the first resistor is connected through a control circuit to ground potential and the first diode device should have a characteristic that allows automatic chroma control (ACC) action without signal distortion in order to avoid signal non-linearities due to ACC action. An automatic color control voltage is applied to the control circuit which biases the diode device conductive in such a way that the amount of unbalance of the first bridge is controllable in dependence on the amplitude of said chroma components available at the output of the first bridge circuit.

The invention is illustrated in the drawing in which.

Figure 1:
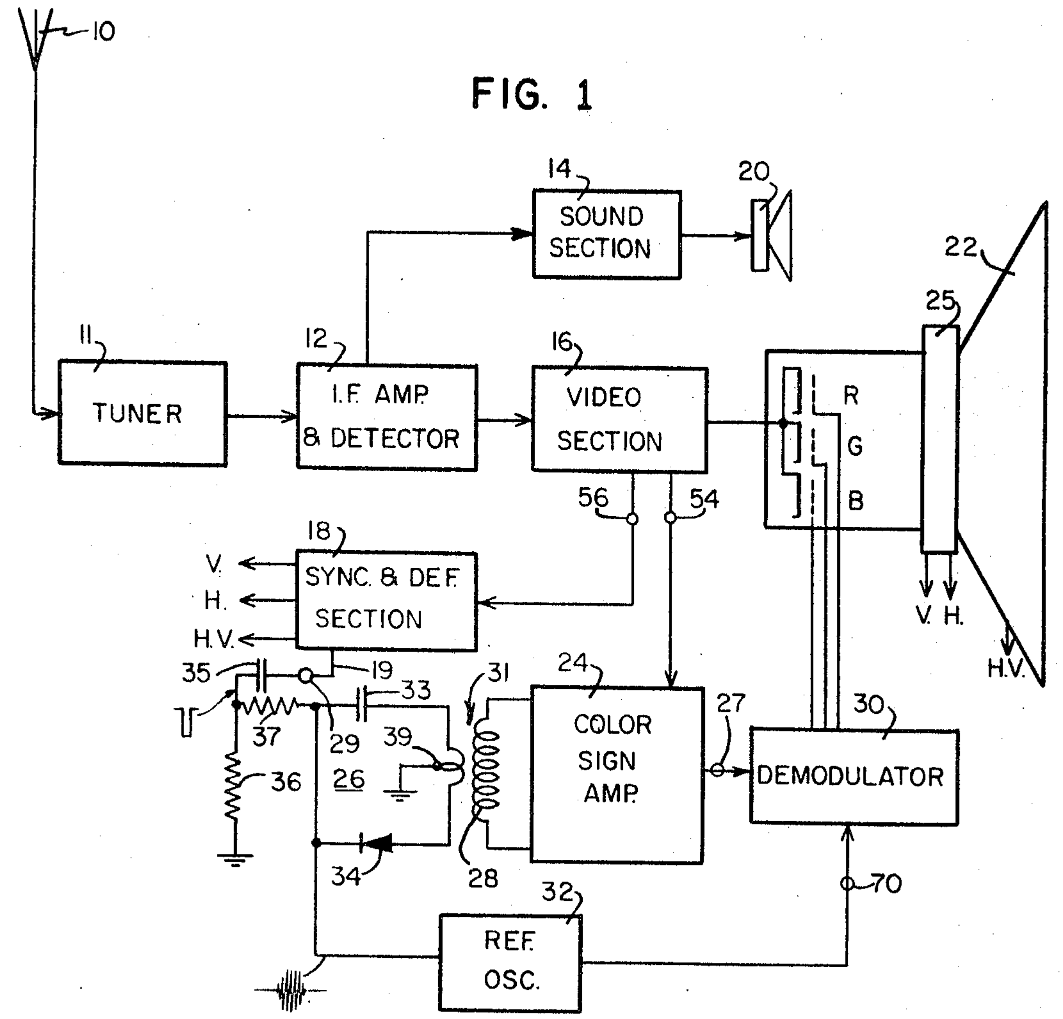
FIG. 1 shows partly in block and partly schematic a color television receiver incorporating a burst signal separator according to the invention.

In FIG. 1 there is illustrated an antenna 10 which receives the transmitted color television signal and couples it to tuner 11 which separates and converts a desired television signal from other signals which may be present. The frequency converted color signal is amplified and detected in IF amplifier and detector 12 and coupled to a sound section 14 and through a video section 16 and through terminal 54 to a color signal amplifier 24. The output of the sound section 14 is an audio signal which is coupled to a loudspeaker 20. The output of the video section 16 is a video signal which is coupled to picture tube 22 which may be a three-beam color tube or some other suitable color picture tube. The video signals developed in video section 16 are also coupled through therminal 56 to synchronizing and deflection section 18 where the synchronizing signal is removed and deflection signals and high voltages are generated. These deflection signals comprise vertical and horizontal sawtooth sweep signals at the vertical and horizontal deflection frequencies (60 c.p.s. and 15.75 kc. respectively) which are applied to the magnetic deflection yoke 25 on the neck of the three-beam color tube 22 to sweep the electric beam therein.

A gating pulse at the horizontal deflection frequency is also developed and is available at the output lead 19 of the synchronizing and deflection section 18. The gating pulse is of negative polarity and is present during the reception of the color synchronizing or burst signal and applied through terminal 29 to a bridge burst separator 26.

The color signal amplifier 24 serves as amplifier for chroma modulation components in form of a 3.58 megacycle suppressed color subcarrier signal obtained from the video section 16. The chroma components of the composite television signal is applied through terminal 27 to the color demodulator 30. The demodulated chroma signals are applied to the blue, green and red control grids of the color picture tube 22.

The bridge burst separator 26 comprises a transformer 31 the primary winding 28 of which is coupled to the color signal amplifier 24. The secondary winding 39, which has only a few turns (bifilar) is part of the bridge circuit which is completed by a capacitor 33 and the junction layer capacitance of diode 34. The secondary winding comprises a center tap which is connected to ground potential. The junction of capacitor 33 and diode 34 is coupled to the color reference oscillator 32 to synchronize the generated wave which is applied through terminal 70 to demodulator 30. The same junction is further connected through resistor 37 in series with capacitor 35 to the output lead 19 of the synchronizing and deflection section 18. A resistor 36 is connected between ground potential and the junction of capacitor 35 and resistor 37 and serves as load for the gating signal while resistor 37 serves as load for the chroma components when the balance of the bridge is disturbed so that the chroma components can be translated through the bridge circuit. The polarity of the diode 34 is such that the gating pulse appearing at the terminal 29 renders the diode conductive. Since the gating pulse of the receiver shown in the drawing is negative, the anode of diode 34 has to be connected to the secondary winding 39.

The operation of the bridge burst separator will occur in the manner described subsequently. The chroma signal is applied from the color signal amplifier through primary winding 28 across the two adjacent branches of the bridge formed by secondary winding 39. As long as diode 34 is nonconductive the bridge is balanced so that no signal appears across the diagonal between the center tap and the junction of capacitor 33 and diode 34. However, as soon as the horizontal blanking pulse is applied from the synchronizing and deflection section 18 through capacitor 35 and resistor 37 to the bridge the diode is rendered conductive and the balance is disturbed so that the signal across winding 39 appears at the diagonal between the center tap and the junction of capacitor 33 and diode 34. Since the horizontal blanking pulse applied to the diode is synchronized by means of the same composite color television signal as the chroma components applied to the winding 39, the diode is rendered conductive and the bridge is unbalanced during the appearance of the burst signal at winding 39. Thus, the burst appears across resistors 36 and 37 and is translated to the reference oscillator for synchronizing the same.

The bridge separator according to the invention provides a very simple effective burst gate which needs no neutralization to prevent a coupling through of the chroma modulation to the reference oscillator which would disturb a true color reproduction. Since no considerable loss of energy occurs no amplification for the burst signal is necessary to have a burst signal of the energy level required.

Figure 2:
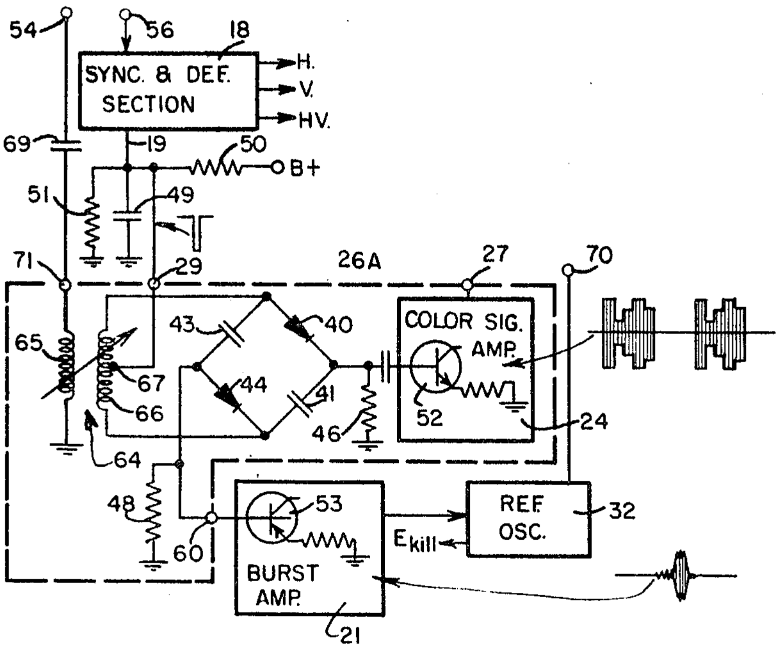
FIG. 2 shows the two bridge separation circuit for separating the chroma subcarrier modulation components and the burst signal of the color control signal.

In FIG. 2, there is illustrated a modification of the bridge separator according to the invention which can be utilized for producing with one single gating pulse burst and chroma components as two independent output signals. The modified separation circuitry can be connected to the terminals 27, 54, 56 and 70. The essential two bridge separator 26A comprises a transformer 64 the primary winding 65 of which is coupled through a capacitor 69 through terminal 54 to the video section 16. The secondary winding 66 has a center tap 67 which is connected through terminal 29 and lead 19 to the synchronizing and deflection section 18. The secondary winding 66 further provides two common branches of a first and second bridge circuit. The first bridge circuit is completed by a diode device 40 and a capacitor 41 series connected across the secondary winding 66. The second bridge circuit is completed by a capacitor 43 and a diode device 44 also series connected across the secondary winding 66. Because both the bridge circuits have the secondary winding 66 in common which comprises two adjacent branches, also the diagonal across the common branches is common to both bridge circuits. The color control signal is fed into both bridge circuits across this common diagonal by means of the inductive coupling from primary winding 65 to secondary winding 66. The inductive coupling of the transformer 64 may be variable.

The diagonals between the center tap 67 and the junction of the diode device 40 and capacitor 41 of the first bridge circuit or the junction of capacitor 43 and the diode device 44 of the second bridge circuit respectively, provide two separate output circuits. The output circuit of the first bridge circuit includes resistor 46 and the output circuit of the second bridge circuit includes resistor 48, both are connected between the accompanying junction and ground potential. These separate diagonals are completed by capacitor 49 which connects center tap 67 through terminal 29 to ground potential. The diode devices 40 and 44 are connected into the bridge circuits so that diode device 44 is reversed biased and diode device 40 is conducting when a positive DC potential or the positive portion of a pulse is applied through center tap 67. The positive DC potential is derived from a voltage divider having resistors 50 and 51 connected between positive power supply and ground potential. This DC potential can be omitted in case an AC coupled gating pulse is used.

The resistor 46 is coupled to the input of the color signal amplifier 24 and the resistor 48 is coupled to the input of the burst amplifier 21 which is coupled to a reference oscillator 32 for reference carrier synchronization by applying a correction voltage to the reference oscillator 32 with frequency and phase of the color reference burst in the received television signal. The corrected subcarrier frequency for chroma signal demodulation is coupled through terminal 70 to the demodulator 30.

The input circuit of the color signal amplifier 24 includes a transistor 52 which is of the opposite conductivity type than transistor 53 of the input circuit of the burst amplifier 21. Thus, an additional blanking and gating effect is obtained which reduces the criticality of balance of the bridge circuits so that a perfect separation is achieved.

The operation of the separation bridge circuit will occur in the manner described subsequently. The color control signal including the chroma subcarrier modulation components and the burst signal representing the chroma subcarrier is applied from the video section through capacitor 69 and primary winding 65 across the common branches of the first and second bridge circuit formed by the secondary winding 66. Since the DC bias potential applied from the voltage divider of resistors 50, 51 renders the diode device 40 of the first bridge circuit conductive and the diode device 44 of the second bridge circuit nonconductive, the first bridge circuit is unbalanced and the second bridge circuit is balanced so that the signal applied across winding 66 appears at the diagonal between the center tap 67 and the junction of the diode device 40 and capacitor 41. The signal portion across resistor 46 serves as input signal for the color signal amplifier 24. However, as soon as the horizontal blanking pulse is applied from the synchronizing and deflection section 18 through the center tap 67 to the bridge circuit with a polarity opposite to the DC bias potential and an amplitude big enough to overcome the DC bias, the diode device 44 of the second bridge circuit is rendered conductive and disturbs the balance whereas the diode device 40 is rendered non-conductive balancing the first bridge circuit so that the signals across the common branches now appears at resistor 48 of the diagonal of the second bridge circuit and serves as input signal for the burst amplifier 21. Since the horizontal blanking pulse applied to the common branches is synchronized by means of the same composite color television signal as the color control signal applied to the primary winding 65, the diode device 44 is rendered conductive and the second bridge circuit is unbalanced respectively during the appearance of the burst signal at winding 65. Thus, the burst signal appears also across resistor 48 and is translated through burst amplifier 21 to the reference oscillator 32 for synchronizing the same.

Figure 3:
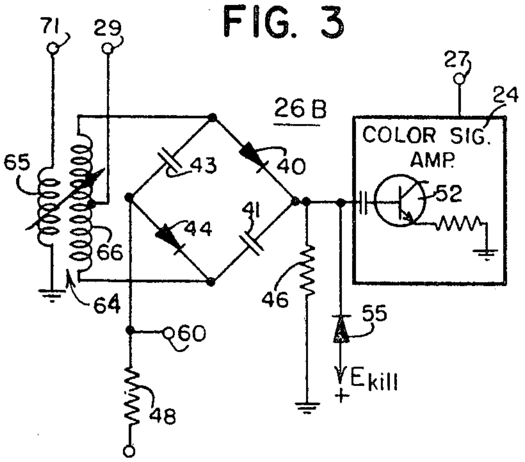
FIG. 3 shows the two bridge separation circuit with a color killer circuit operative when no color control signal is transmitted.
Figure 4:
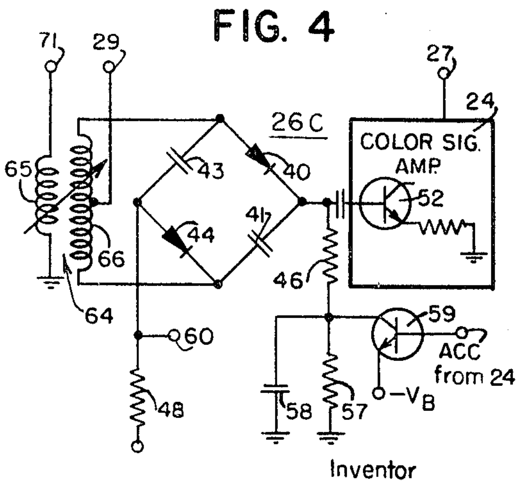
FIG. 4 shows a control circuit coupled to the two bridge separation circuit used for automatic chroma control.

The separation bridge circuit 26A can be utilized also for a color killer action. It can be accomplished by adding a switching diode or transistor which allows to generate a cutoff bias across the resistor 46. In FIG. 3 the modified two bridge separation circuit 26B for a color killer action is shown. It can be connected to the terminals 27, 29, 60 and 71 instead of the two bridge separation circuit 26A and is similar to the separation bridge circuit 26A shown in FIG. 2. Therefore, like parts have been indicated with similar reference characters. The modified circuit 26B is provided with a switching diode 55 which is connected between a positive color killer voltage derived from the reference oscillator section 32 and the junction of the diode device 40 and capacitor 41 of the first bridge circuit. When the color killer voltage is applied to the switching diode 55, it generates a cutoff bias across resistor 46 completely disabling the diode device 40 so that the first bridge circuit is balanced and no output signal appears across the diagonal between the center tap and the junction of capacitor 41 and the diode device 40. Since the color killer action does not affect the second bridge circuit, the burst channel is not affected.

The separation bridge circuit 26A further can be used for an automatic chroma control by gradually forward biasing the diode device 40. FIG. 3 shows the modified circuit 26C which can be connected to the terminals 27, 29, 60 and 71 of the circuitry of FIG. 2. Since the modified separation bridge circuit 26C is similar to the separation bridge circuit 26A shown in FIG. 2, the like parts have been indicated by similar reference characters. The modified circuit 26C is provided with control means comprising a resistor 57 in parallel to a capacitor 58 connected between resistor 46 and ground potential. A transistor 59 is connected with its colector electrode to the junction of resistors 46 and 57, whereas the emitter electrode is biased with a potential to keep the transistor conducting when a chroma signal level control voltage is applied to the base electrode. The current flow through the transistor 59 and resistor 57 generates a voltage drop across resistor 57 so that the voltage applied through resistor 46 to the diode device 40 changes the state of conductivity of the diode device 40 and by this changes gradually the balance of the first bridge circuit. The diode device 40 should be chosen with minimum signal distortion in mind in order to avoid any nonlinearities caused by ACC action. Instead of the diode device 40 either semiconductor device can be used which allows to change the balance of the first bridge gradually according to a control voltage applied thereto.

The advantage of the circuitry according to the invention is the provision of a complete burst chroma signal separation with only a single pulse and without utilizing active elements. The combination of two transistors of the opposite conductivity type in the following burst amplifier and color signal amplifier stages results in an additional blanking and gating effect, making the signal separation very effective by alternating balancing and unbalancing first and second bridge circuits. Thus, the problem for exact timing can be considerably reduced requiring only one gating pulse. By insignificant modifications of the separation bridge circuitry the same can be used at the same time very efficiently as a color killer circuit without active elements. Since the color killer circuit works at low levels also feedthrough problems are considerably reduced.

Also the utilization of the separation circuit in combination with an automatic chroma control is of advantage since the automatic chroma control does not affect burst amplitude and as a result the phase detector circuit. The required number of components is considerably reduced since no neutralization for the burst gate and blanker stages is necessary. The saving is considerable, particularly when the separation circuit is used not only in combination with a color killer circuit but also with the automatic chroma control. Separating burst from chrominance allows to optimize automatic chroma control performance since the burst signal is not reduced due to transistor cutoff conditions at high input levels. Separate automatic chroma control loops are also possible.

I claim:

1. A signal separating circuit comprising in combination bridge circuit means having first and second diagonals and four branches, at least one but less than all of said branches comprising electronic switching means for balancing said bridge circuit means in one conductive condition and for unbalancing said bridge circuit in the other conductive condition, signal circuit means coupled to said first diagonal of said bridge circuit and applying a signal to said bridge circuit, gating means coupled to said bridge circuit and being responsive to a gating signal for changing the conductive state of said electronic switching means so that in response to said gating means said bridge circuit is balanced and unbalanced to provide an output across said second diagonal.

2. The separating circuit according to claim 1 in which said electronic switching means comprises a semiconductor device the capacitance of which is of a value to balance the bridge in the non-conductive condition.

3. The separating circuit according to claim 1 in which said gating means is coupled across a portion of said second diagonal.

4. In a television receiver having synchronizing and deflection means, color signal amplification means and reference oscillator means including in combination, transformer means having a primary winding and a center tapped secondary winding, said primary winding being coupled to the color signal amplification means and being responsive to a color signal including a burst component, capacitor means and electronic switching means connected in series across said secondary winding and providing a bridge circuit therewith, said electronic switching means providing a balance of said bridge circuit in the condition of being non-conductive and providing an unbalance of said bridge circuit in the condition of being conductive, coupling circuit means coupled to the synchronizing and deflection means and to the junction of said capacitor means and said electronic switching means, said coupling circuit means being responsive to a horizontal blanking pulse from the synchronizing and deflection means for rendering said electronic switching means conductive so that for the time of conducting the burst component of said color signal appears at the junction of said capacitor means and said electronic switching means to provide an output for synchronizing the reference oscillator means.

5. A television receiver according to claim 4 in which said control means comprise a capacitor and a first resistor series connected between the synchronizing and deflection means and the junction of said capacitor means and said electronic switching means, and a second resistor connected between the junction of said capacitor and said first resistor and said ground potential.

6. A television receiver according to claim 4 in which said electronic switching means comprises a semi-conductor diode.

7. In a color television receiver for using a color control signal including chroma subcarrier modulation components and a burst signal representing the chroma subcarrier, the combination of first and second bridge circuit means each having first and second branches and third and fourth branches in common, input means coupled to said common branches for supplying the color control signal, a chroma component utilization circuit coupled between the junction of said first and second branches of said first bridge circuit means and the junction of said third and fourth branches, a burst signal utilization circuit coupled between the junction of said first and second branches of said second bridge circuit means and the junction of said third and fourth branches, first circuit means for balancing said first bridge circuit means and unbalancing said second bridge circuit means during the time of the burst signal, and second circuit means for unbalancing said first bridge circuit means and balancing said second bridge circuit means during the time of the chroma components.

8. In the color television receiver according to claim 7 in which said chroma components utilization circuit includes bias means for balancing said first and second bridge circuit means when no color control signal is applied to said common branches.

9. In the color television receiver according to claim 7 in which said chroma components utilization circuit includes control means for controlling the amount of unbalance of said first bridge circuit means in dependence on the amplitude of the chroma components at said chroma component utilization circuit.

10. In the color television receiver according to claim 7 in which said input means comprise a transformer having a primary winding and a center tapped secondary winding, said primary winding being applied with the color control signal, said secondary winding providing said common branches across which the color control signal is applied to said first and second bridge circuit means.

11. In the color television receiver according to claim 7 in which said first and second branches of said first bridge circuit comprise a first electron control device and first impedance means series connected across said common branches, first resistance means connected to the junction of said first impedance means and said first electron control device of said first bridge circuit for providing a chroma component output during the time of the chroma components, and in which said first and second branches of said second bridge circuit comprise second impedance means and a second electron control device series connected across said common branches, second resistance means connected to the junction of said second electron control device and said second impedance of said second bridge circuit for providing a burst signal output during the time of the burst signal.

12. In the color television receiver according to claim 7 in which said first and second balancing circuit means comprise a bias circuit including a synchronizing deflection means and a direct current power source, and in which said input means includes a secondary winding having a center tap connected to said bias circuit for applying a direct current signal through said secondary winding to said first branch of said first bridge including a first electron control device and rendering said first electron control device conductive to unbalance said first bridge circuit during the time of the chroma components and further for applying a gate signal through said secondary winding to said second branch of said second bridge including the second electron control device and rendering said second electron control device conductive to unbalance said second bridge circuit during the time of burst signal.

13. In the color television receiver according to claim 11 in which said first and second electron control devices comprise diodes each having a junction layer capacitance during the reverse biased state of an amount to balance said first and second bridge respectively, and in which said first and second impedance means comprise capacitors.

14. In the color television receiver according to claim 8 in which said bias means comprise a diode which is open biased when no color control signal is applied to said common branches.

15. The color television receiver according to claim 9 in which said control means includes a transistor which is coupled to the junction of said first and second branch of said first bridge circuit means including an electron control device, said electron control device being rendered conductive in dependence on the current through said transistor.

16. In a color television receiver having video section means providing a color control signal including chroma subcarrier modulation components and a burst signal representing the chroma subcarrier, synchronizing and deflection means providing a horizontal deflection pulse, color amplifier means and burst amplifier means, the combination of a transformer having a primary winding and a center tapped secondary winding, a first bridge circuit comprising said center tapped secondary winding, a first capacitor and a unidirectional semiconductor device series connected across said secondary winding, a second bridge circuit comprising said center tapped secondary winding, a diode and a second capacitor series connected across said secondary winding, first resistor means coupled between the junction of said first capacitor and said semiconductor device of said first bridge circuit and a reference potential, said junction of said first bridge circuit coupled to the color amplifier means, second resistor means coupled between the junction of said second capacitor and said diode of said second bridge circuit and said reference potential, the junction of said second bridge circuit coupled to the burst amplifier means, said primary winding coupled to the video section means for applying the color control signal to said first and second bridge circuit, said center tap coupled to a direct current bias source and the synchronizing and deflection means for supplying a bias potential through said secondary winding to said unidirectional semiconductor device for rendering said semiconductor device conductive to unbalance said first bridge circuit and to balance said second bridge circuit during the time of the chroma components, and further for applying the horizontal deflection pulse through said secondary winding to said diode for rendering said diode conductive to unbalance the second bridge circuit and to balance a first bridge circuit during the time of the burst signal.

References Cited

UNITED STATES PATENTS 2,817,757 12/1957 Durbin ---------- 307—257 XR

FOREIGN PATENTS 831,594 3/1960 Great Britain.

RICHARD MURRAY, Primary Examiner

U.S. Cl. X.R.

178—69; 328—139